(12) United States Patent
Labelle

(10) Patent No.: US 7,251,370 B2
(45) Date of Patent: Jul. 31, 2007

(54) METHOD AND DEVICE FOR COMPRESSING AND/OR INDEXING DIGITAL IMAGES

(75) Inventor: Lilian Labelle, St Samson sur Rance (FR)

(73) Assignee: Canon Kabushiki Kaisha, Tokyo (JP)

( * ) Notice: Subject to any disclaimer, the term of this patent is extended or adjusted under 35 U.S.C. 154(b) by 501 days.

(21) Appl. No.: 10/152,023

(22) Filed: May 22, 2002

(65) Prior Publication Data

US 2002/0176629 A1 Nov. 28, 2002

(30) Foreign Application Priority Data

May 22, 2001 (FR) .................................. 01 06725

(51) Int. Cl.
 G06K 9/36 (2006.01)
 G06K 9/54 (2006.01)
(52) U.S. Cl. .................. 382/239; 382/232; 382/305
(58) Field of Classification Search ................ 382/232, 382/305; 707/2–6
 See application file for complete search history.

(56) References Cited

U.S. PATENT DOCUMENTS

| | | | |
|---|---|---|---|
| 5,579,471 A | 11/1996 | Barber et al. | 395/161 |
| 5,915,038 A * | 6/1999 | Abdel-Mottaleb et al. | 382/209 |
| 6,233,359 B1 * | 5/2001 | Ratnakar et al. | 382/250 |
| 6,301,392 B1 * | 10/2001 | Acharya | 382/239 |
| 6,728,406 B1 * | 4/2004 | Murao | 382/191 |
| 6,813,384 B1 * | 11/2004 | Acharya et al. | 382/232 |

FOREIGN PATENT DOCUMENTS

EP 1089280 A2 4/2001

OTHER PUBLICATIONS

Liang, Kai-Chieh and Kuo, Jay "Retrieval and Progressive Transmission of Wavelet Compressed Images", IEEE International Symposium on Circuits and Systems, pp. 1464-1467, Jun. 1997.*
Lee, Jungwoo and Dickinson, Bradley, "Multiresolution Video Indexing for Subband Coded Video Databases", SPIE Storage and Retrieval for Image and Video Databases II, vol. 2185, pp. 162-173, 1994.*
Mandal, M.K., Idris, F., Panchanathan, S., "Critical Evaluation of Image and Video indexing Techniques in the compressed domain", Image and Vision Computing Journal, vol. 17, pp. 513-529, 1999.*

(Continued)

Primary Examiner—Matthew C. Bella
Assistant Examiner—Utpal Shah
(74) Attorney, Agent, or Firm—Fitzpatrick, Cella, Harper & Scinto

(57) ABSTRACT

A method of indexing a digital image which has been compressed or is to be compressed according to a compression method using compression parameters which influence the resulting quantity of information contained in at least part of the compressed image, the indexing requiring a predetermined quantity of information. The method includes, prior to a step of indexing the digital image, the steps of determining at least one compression parameter for at least part of the compressed image, and checking whether the resulting quantity of information corresponding to the compression parameters is adapted to the predetermined quantity of information required for the indexing of the image.

13 Claims, 10 Drawing Sheets

OTHER PUBLICATIONS

Liang, K and Kuo, Jay "Waveguide: A Joint Wavelet-Based Image Representation and Description System", IEEE Transactions on Image Processing, vol. 8, No. 11, Nov. 1999, pp. 1619-1629.*

Lee J. et al., "Hierarchical Video Indexing And Retrieval For Subband-Coded Video", IEEE Transactions On Circuits And Systems For Video Technology, IEEE Inc. New York, vol. 10, No. 5, Aug. 2000, pp. 824-829.

Mandal M. K. et al., "A Critical Evaluation Of Image And Indexing Techniques In The Compressed Domain", Image and Vision Computing, Guildford, GB, vol. 17, 1999, pp. 513-529.

Eickeler S. et al., "High Quality Face Recognition In JPEG Compressed Images", Image Processing, 1999, ICIP 99 Proceedings, 1999 International Conference On Kobe, Japan 24-28 Oct. 1999, Piscataway, NJ, IEEE US, Oct. 24, 1999, pp. 672-676.

Shneier et al., "Exploting the JPEG Compression Scheme For Image Retrieval", IEEE Transactions on Pattern Analysis and Machine Intelligence, 18(8), Aug. 1996.

* cited by examiner

METHOD AND DEVICE FOR COMPRESSING AND/OR INDEXING DIGITAL IMAGES

BACKGROUND OF THE INVENTION

1. Field of the Invention

The present invention concerns a method and device for indexing and modifying the compression parameters of digital images.

2. Related Art

A search for images makes it possible to find, amongst an image database, those which correspond most to a criterion without having to analyse the content of each image in the database.

More precisely, the purpose of an indexing system is to associate, with each image in the base, information characteristic of the content of the image, referred to as the "index of the image". All this information constituting what is referred to as the "index of the database". Typically, the content of an image is characterised by its colour distribution (histogram) and its texture.

A user interrogates an image database through a request containing information characteristic of the type of image sought. Conventionally, this request consists of an example image. The user chooses an image, in the database or external to it, whose content is similar to the type of image sought.

The system next associates with this image an item of information characteristic of its content. The index thus associated with this example image is then compared with the index of the database according to a search strategy.

It is possible for example to cite the QBIC ("Query By Image Content") system of IBM, which consists of extracting, from a non-compressed image, a description of its content.

This description consisting of characterising the content of the image by the distribution of the colours and textures of this image. For further explanations on this system, reference can be made to U.S. Pat. No. 5,579,471 of the company IBM entitled "*Image query system and method*".

However, the majority of digital images, for obvious reasons of storage problems, are stored in compressed form.

Thus, during the indexing of these images, each image must be decompressed before being able to extract the index associated with each of these images.

This decompression phase can be eliminated if the index is extracted directly from the compressed image. In this case, the time necessary for effecting the indexing phase is reduced.

There are few indexing systems which extract indexes directly from the compressed images.

It is possible notably to cite the studies carried out in order to describe the content of an image, from a discrete cosine transform ("DCT"), or from a decomposition into sub-bands.

This is for example described in "Exploiting the JPEG compression scheme for image retrieval", IEEE Trans Patt Anal Mach Intell, 18(8), August 1996, in the case of a DCT, and by "Multiresolution video indexing for subband video databases", Proc of SPIE Storage and Retrieval for Image and Video Databases, in the case of a decomposition into sub-bands.

It is important to note that, in these compressed image indexing systems, the compression and indexing phases are performed separately.

This is because a user defines the coding parameters according to criteria such as the minimisation of the memory location, necessary for storing the image, or so as to obtain a bit stream organised by quality levels, thus facilitating the display of the image on a distant screen.

The description of an image from a bit stream may, in some cases, not be faithful to the content of the compressed image.

Take the example where an image is compressed according to the coder into sub-bands described by FIG. 5a (described subsequently), a frequency decomposition of which is given by FIG. 6c (described subsequently). If the indexing method consists of characterising the content of the compressed image by means of a histogram calculated on the low-frequency sub-band referenced $LL_3$ in FIG. 6c, it is necessary for the histogram to represent the visual content of the image faithfully.

The resolution RES1 of the low-frequency sub-band is fixed by the user who has compressed the image, without being preoccupied whether this compressed image would be indexed or not.

Thus, according to the resolution RES and/or the number of decomposition levels, it may happen that the resolution RES of the sub-band may be around a few pixels, which proves inadequate for obtaining a histogram representing the content of the image.

SUMMARY OF THE INVENTION

The aim of the present invention is to remedy the problem mentioned and to propose a digital image indexing method in which the compression parameters will depend on the indexing parameters which can be used during the indexing of the compressed image.

To this end, the invention proposes a method of indexing on a compressed digital image or one which is to be compressed according to a compression method using compression parameters which influence the quantity of resulting information contained in at least part of the compressed image, the indexing requiring a predetermined quantity of information, characterised in that the method includes, prior to a step of indexing the digital image, the steps of:

Determining at least one of the compression parameters for at least part of the compressed image, checking whether the resulting quantity of information corresponding to the compression parameters is adapted to the predetermined quantity of information required for indexing of the image.

Correlatively, the invention proposes a device for indexing on a compressed digital image or one to be compressed according to a compression method using compression parameters which influence the resulting quantity of information contained in at least part of the compressed image, the indexing requiring a quantity of information, characterised in that the device comprises:

determination means for determining at least one compression parameter for at least part of the compressed image, verification means for verifying whether the resulting quantity corresponding to the compression parameters is adapted to the predetermined quantity necessary for indexing the image and indexing means operating according to the result of the verification means.

Thus a compressed image will be indexed only after a check whether the quantity of information necessary for the indexing corresponds to the quantity of information contained in at least part of the compressed image.

This will make it possible to perform indexings more in accordance with the original image before its compression. The indexing errors will therefore be reduced and thus, when a search is made on compressed and indexed images, the results obtained will therefore be better.

The invention also concerns a method of compressing a digital image, the compression being effected according to compression parameters influencing the resulting quantity of information contained in at least part of the compressed image, characterised in that the method comprises the steps of:

checking whether the quantity of information contained in at least one part of the image corresponding to the compression parameters is adapted to an indexing of the compressed image,
   modifying at least one of the compression parameters if the resulting quantity is not adapted to the indexing of the compressed image,
   compressing the digital image according to at least one of the modified compression parameters.

Correlatively, the invention concerns a device for compressing a digital image, the compression being effected according to compression parameters influencing the resulting quantity of information contained in at least part of the compressed image, characterised in that the device comprises:

means for checking whether the quantity of information contained in at least part of the image corresponding to the compression parameters is adapted to an indexing of the compressed image,
   means of modifying at least one of the compression parameters if the resulting quantity is not adapted to the indexing of the compressed image,
   means of compressing the digital image according to at least one of the modified compression parameters.

According to a particular embodiment, the quantity of information contained in at least part of the compressed image is represented by the number of coefficients contained in said part.

More precisely, the verification consists of comparing the number of coefficients contained in the part of the image with a predetermined number representing the predetermined quantity of information necessary for indexing the image.

In addition, and according to a particular embodiment of the invention, if the resulting quantity of information is not adapted to the required quantity, at least one compression parameter is modified, this parameter being the image decomposition level number and/or the quantisation step.

This is because these parameters have a direct effect on the quality of the indexing. The number of resolution levels reducing or increasing the number of coefficients contained in certain sub-parts of the image, the quantisation step modifying the quality of the reconstruction of the image.

According to another particular embodiment, the number of coefficients contained in the lowest-resolution sub-band of the compressed image is used for this check.

This sub-band is particularly advantageous since it comprises a minimum number of coefficients, these coefficients containing a large quantity of information on the original image.

According to another variant of the invention, the image is compressed in the form of a bit stream and if at least one of the compression parameters is modified the bit stream is decompressed and then compressed according to the compression parameters modified in order to form a new bit stream which will be stored as a replacement for the previous bit stream.

According to another embodiment of the invention, the compression parameter enabling the quantity of information to be determined is obtained by means of a request to the user.

The image to be compressed is compressed using the modified compression parameters.

The invention also concerns a digital apparatus including the device according to the invention, or means of implementing the method according to the invention. This digital apparatus is for example a digital photographic apparatus, a digital camcorder or a scanner.

The invention also relates to a computer program containing one or more sequences of instructions able to implement the image indexing method when the program is loaded and executed in a computer.

The invention also relates to an information carrier, such as a diskette or a compact disc (CD), characterised in that it contains such a computer program.

The advantages of this device, this digital apparatus, this computer, this computer program and this information carrier are identical to those of the methods as succinctly disclosed above.

BRIEF DESCRIPTION OF THE DRAWINGS

Other particularities and advantages of the invention will also emerge from the following description, given with reference to the accompanying drawings, in which:

FIG. 4b illustrates an example of a method of dividing an image into N blocks according to the method of indexing an image illustrated in FIG. 4a;

FIG. 6a is a circuit for decomposing into frequency sub-bands included in the device of FIG. 5a;

FIG. 6c is an image decomposed into sub-bands by the circuit in FIG. 6a;

DETAILED DESCRIPTION OF THE PREFERRED EMBODIMENTS

Figure 1:
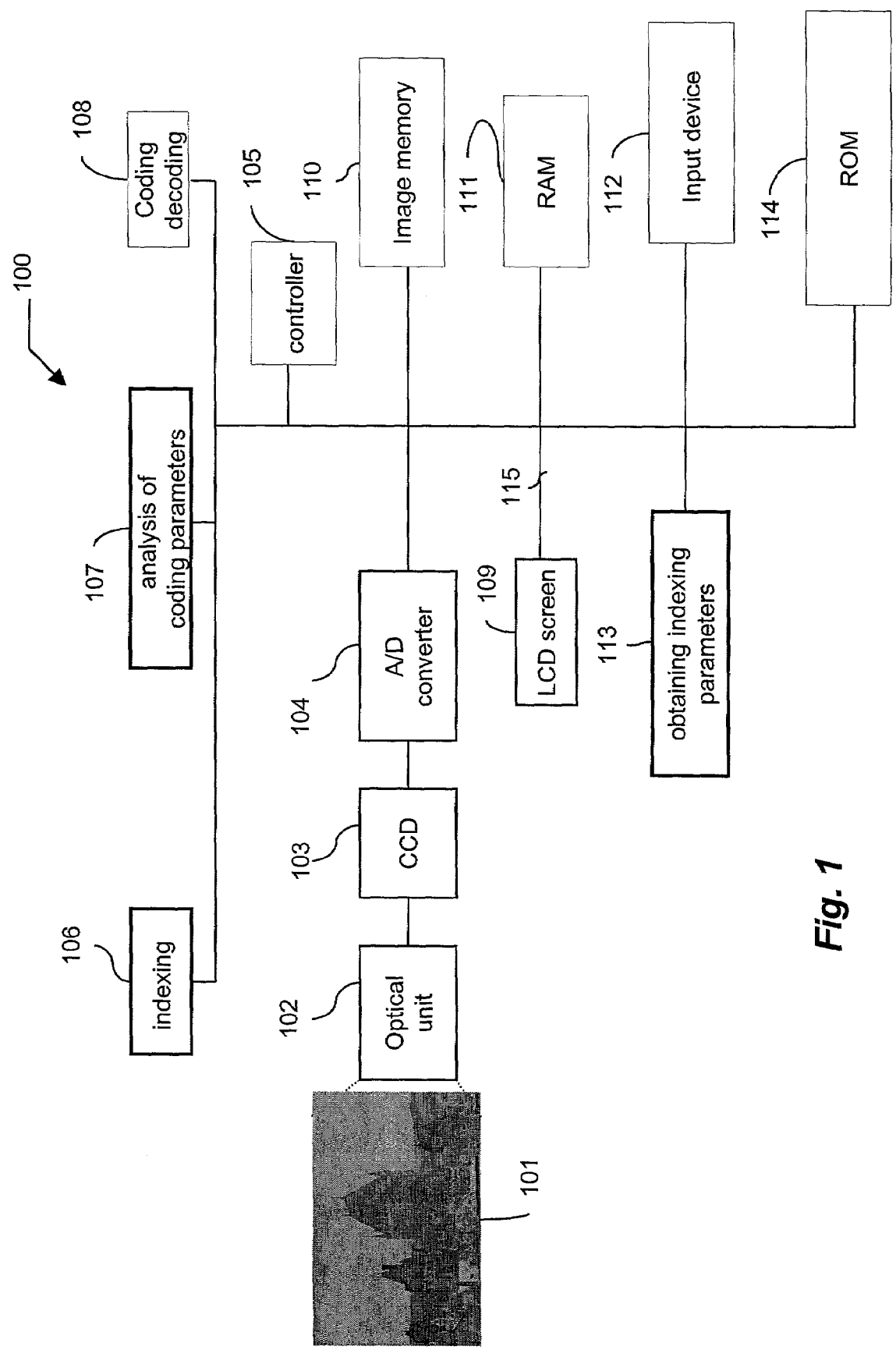
FIG. 1 is a block diagram illustrating the general architecture of a digital photographic apparatus in which the invention is implemented.

A description will first of all be given, with reference to FIG. 1, of a digital photographic apparatus in which the invention is implemented. The digital photographic apparatus 100 contains a memory of the RAM type 111 containing the variables or temporary data necessary for the functioning of the device 100 and enabling the invention to be implemented.

The memory 110, referred to as the image memory, is a memory for storing compressed images taken by the device 100, having been indexed or not. This memory 110 contains the indexes if they exist, associated with the images which it contains.

This is because the invention makes it possible to check whether the compression parameters are compatible with the indexing before the compression thereof.

The invention also makes it possible to be able to index an image already compressed and stored in the memory 110 even if the parameters used during the compression are not matched with the parameters necessary for indexing.

The memory 110 is for example a removable memory such as a flash memory or a compact disc (CD).

The device 100 also contains a circuit 113 which makes it possible to obtain the indexing parameters. They are for example stored in the non-volatile memory of the ROM type 114, or obtained by means of the input device 112 described subsequently.

This memory 114 contains the instructions of the program implementing the instructions of the algorithms as described in FIGS. 2a, 2b, 3 and 4a as well as the conventional algorithms of a digital photographic apparatus.

This device 113 will for example read or calculate from indexing parameters the minimum number of coefficients necessary for indexing the image.

The device 100 also contains an input device 112 which enables the user to define or select coding parameters, to accept a modification thereof proposed according to the invention.

This device 112 consists of at least one switch. The device 100 also contains an LCD screen 109 which makes it possible to display an image and to display messages describing the unfolding of the functioning of the method implemented in the device.

It also has an acquisition chain composed of an optical unit 102 connected to a CCD sensor 103, itself connected to an analogue to digital converter 104, of a coding/decoding circuit 108.

It should be noted that the digitised image at the output of the analogue to digital converter 104 is modified by the controller 105 in order to be able to be displayed by the LCD screen 109.

The device 100 makes it possible to display a coded image on the screen 109. For this purpose, the image is decoded by the decoding circuit of the circuit 108.

In addition, the screen 109 makes it possible to indicate to the user when the coding parameters are modified by the circuit 107. It should be noted that the coding/decoding means 108 is based on a technique of decomposition into sub-bands. This coding/decoding means will be described more precisely in FIGS. 5a and 5b.

It can effect a partial decoding of the compressed image, for example effecting only an entropic decoding of the compressed image in order to supply the coefficients of the subsets necessary for verifying compatibility between the coding parameters and the indexing parameters.

These coefficients are also used during the indexing of the compressed image.

Figure 4A:
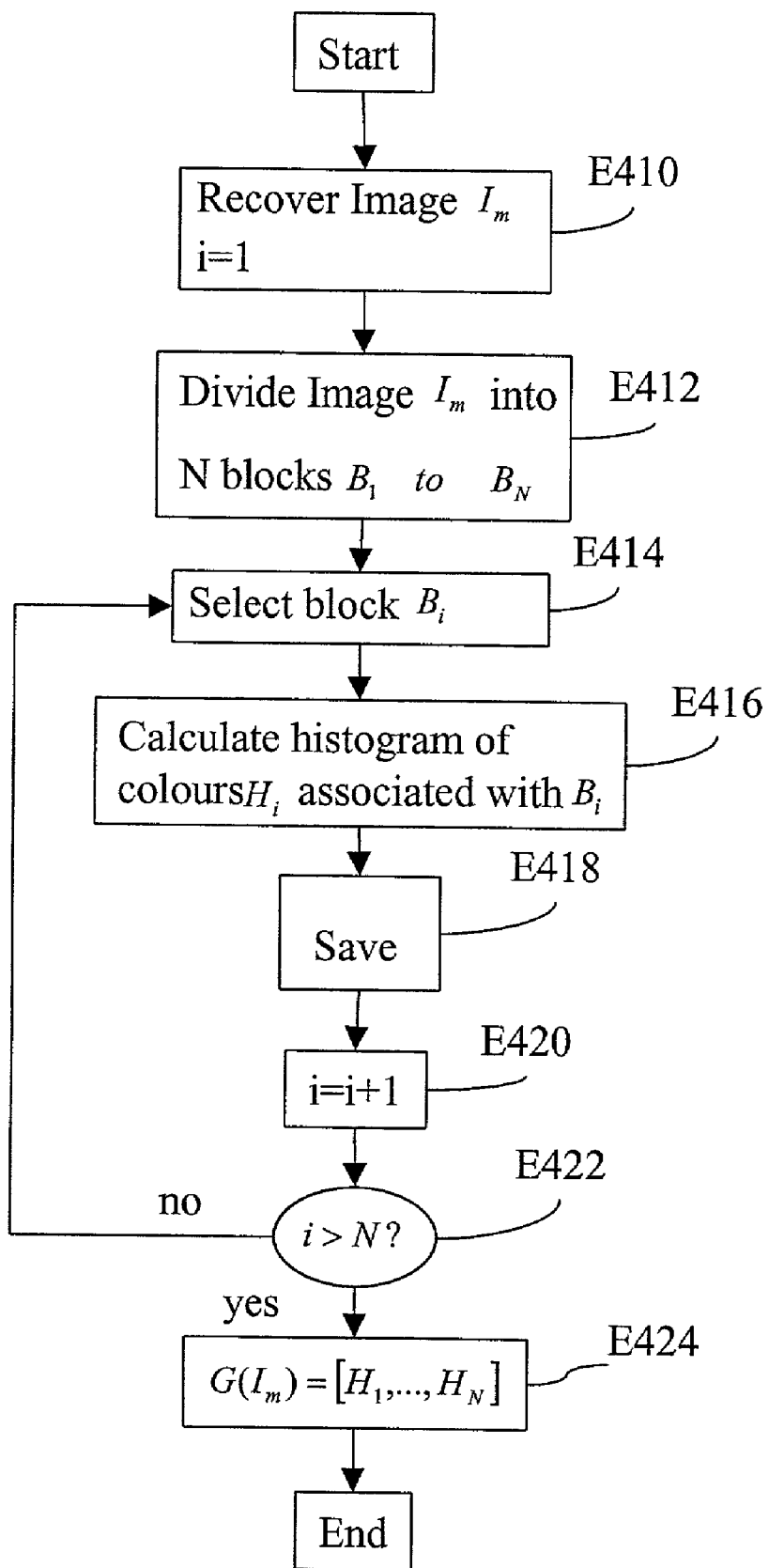
FIG. 4a depicts a flow diagram illustrating the method of indexing an image according to a preferred embodiment of the invention.

The indexing circuit 106 will index the image in accordance with the algorithm described in FIG. 4a. The controller 105 will, on powering up or when the user wishes to index images, load the programs contained in the read only memory 114 and control the activation of the different elements described previously.

It also controls the transfer of information between the different elements by virtue of the bus 115.

Figure 2A:
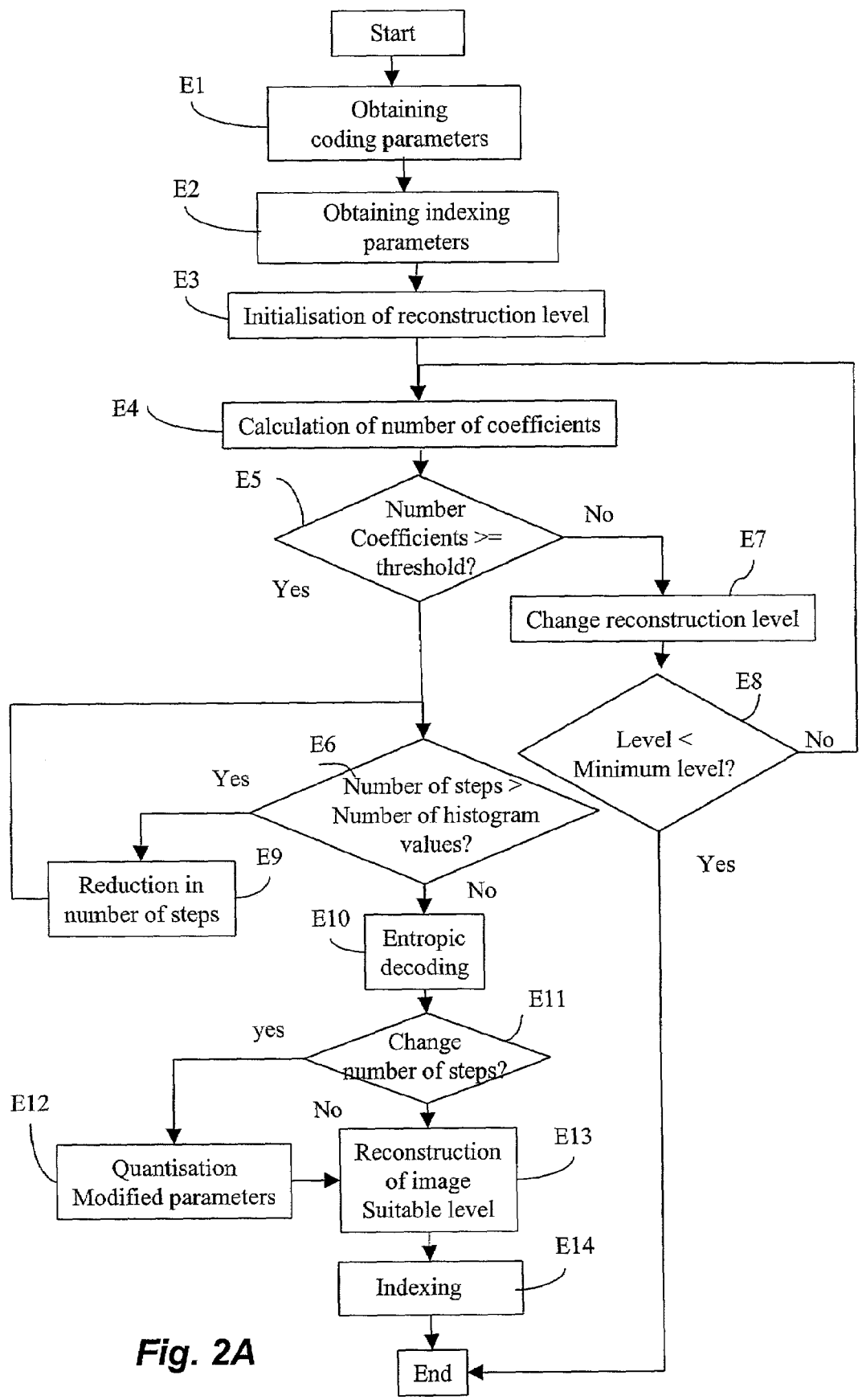
FIG. 2a depicts an algorithm illustrating the indexing of the image according to a first embodiment.

With reference to FIG. 2a, a description will now be given of the indexing algorithm according to a first embodiment. The code of this flow diagram is for example stored in the ROM memories of the devices of FIGS. 1 and 7.

When these devices are powered up, the code is loaded into random access memory and executed by the central unit or the controller of the device.

At step E1, the central unit 301 of the device of FIG. 7, which will be described subsequently, will recover the coding parameters of the image to be indexed. The parameters obtained will in our example be the decomposition levels, the number of quantisation steps. The resolution of the original image is also obtained.

These parameters are extracted from the bit stream which represents the compressed image. More details on the coding process are given in the description of FIGS. 6a, 6b and 6c.

Once this operation has been performed, the central unit passes to step E2, which will recover the indexing parameters which are in our example the number of columns and the number of rows in the grid and the number of values of the histograms. These parameters will be detailed subsequently with reference to FIGS. 4a and 4b.

These indexing parameters are either recovered from random access or ROM memories of the device 350, or defined by the user by means for example of a keyboard 303 or an input device 112.

When the user defines these parameters by means of the keyboard, they will be stored in the random access memory 307 of the device 350 and can subsequently be used for indexing new images.

Whilst this operation has been performed, the central unit passes to step E3, which consists of initialising the reconstruction level with the decomposition level (which is a coding parameter). The decomposition level here being the lowest decomposition level of the compressed image. For example, if the image has been decomposed into 3 decomposition levels, this will be the third.

Step E3 is followed by step E4, which consists of determining the number of coefficients by rows and columns of the reconstructed image according to the current reconstruction level and the resolution of the original image.

This determination is made in the following way, when the image is decomposed on several resolution levels, at each level four times fewer coefficients will be obtained. Starting from the resolution of the image and the number of decomposition levels extracted from the bitstream which represents the compressed image, it is then easy to determine the number of coefficients (by row and by column) for a predetermined level.

Once this operation has been performed the central unit passes to step E5, during which it is tested whether this number of coefficients (by row and by column) is greater than or equal to a threshold.

This threshold is defined by the product of the number of rows (columns) of the grid used for indexing and the minimum number of coefficients necessary for obtaining a significant histogram. This last value is chosen a priori. In our example this value is 10 coefficients.

If the test is negative, step E5 is followed by step E7, which decrements the reconstruction level by one unit, that is to say passes to a higher resolution level which in our case contains 4 times more coefficients than the previous level.

Once this operation has been performed, the central unit passes to step E8, during which it is tested whether this reconstruction level is lower than the minimum reconstruction level, that is to say whether the maximum resolution of the compressed signal has been reached.

In the affirmative, indexing cannot be achieved and the process stops.

In the negative, step E8 is followed by the previously described step E4. Such calculation is performed by multiplying by four the number of coefficients previously calculated.

Where the number of coefficients is greater than the threshold, step E5 is followed by step E6.

At this moment, the algorithm has determined the resolution level and more precisely the sub-bands which will be used for reconstructing the image to be indexed.

At this step, the central unit will test whether the number of quantisation steps (which is a coding parameter) is greater than the number of values of the histogram.

In the affirmative, step E6 is followed by step E9, which reduces this number of quantisation steps by one unit in order then to pass to step E6 again.

The loop consisting of steps E6 and E9 will be reiterated as long as the number of quantisation steps is strictly greater than the number of coefficients used for calculating the histogram.

If the number of quantisation steps is less than or equal to the number of coefficients used for calculating the histogram, the central unit passes to step E10.

During step E10 the quantised coefficients are recovered from the bit stream by previously applying an entropic decoding.

Following this step, the central unit passes to step E11, which tests whether the number of steps has been changed. If such is the case, step E11 is followed by step E12, which quantises the coefficients recovered according to the new number of steps, the new number of steps being the number of steps originally decremented as many times as the loop consisting of steps E6 to E9 is performed.

Next, step E12 is followed by step E13, which reconstructs the coefficients of the sub-band corresponding to the reconstruction level determined according to the final quantisation step.

This reconstructed image is then used during step E14, which extracts and stores the index from this image.

Figure 2B:
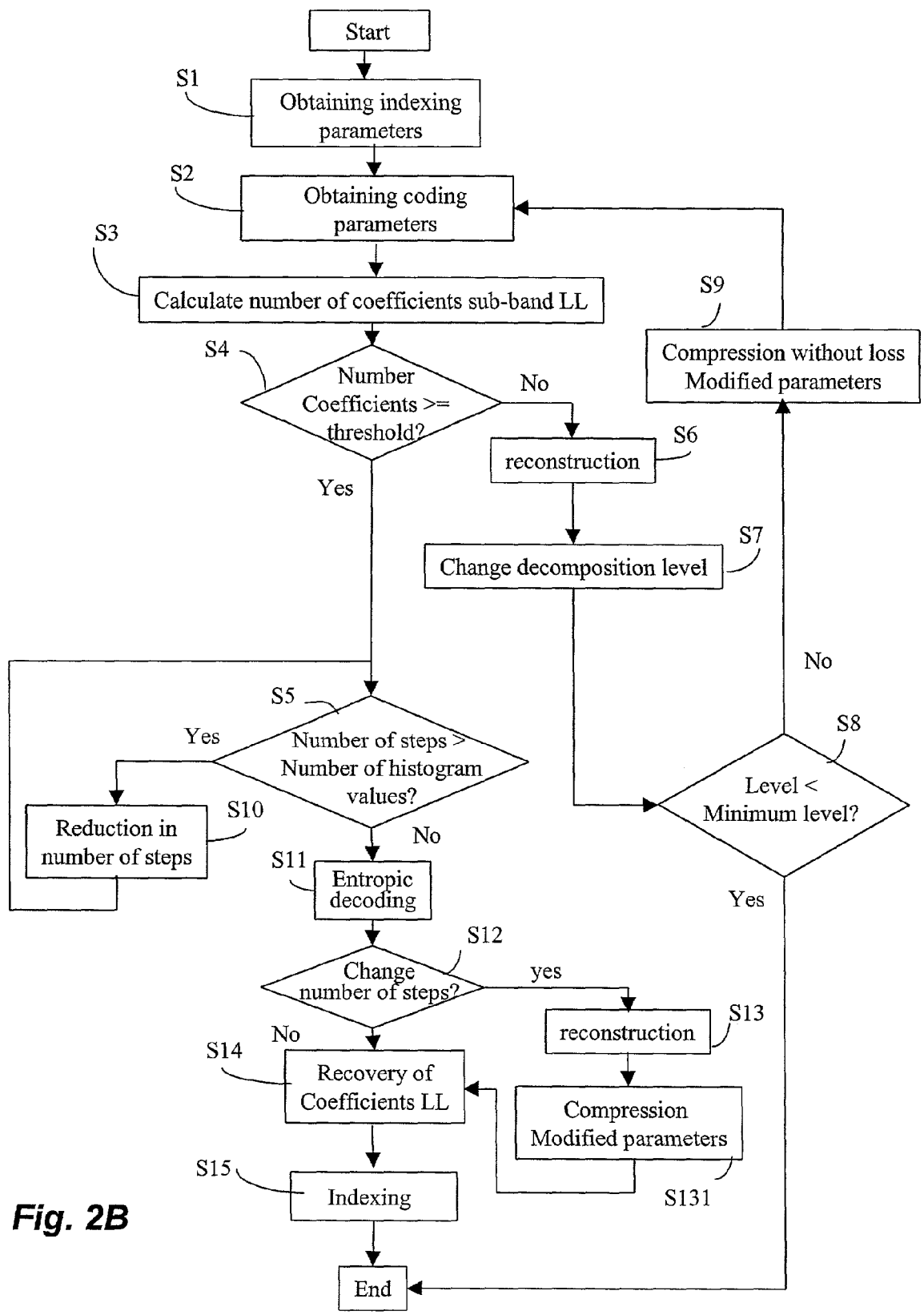
FIG. 2b depicts an algorithm illustrating the indexing of the image according to a second embodiment.

A description will now be given of a second embodiment with reference to FIG. 2b. In this variant, the modified compression parameters will be the decomposition level of the signal and the quantisation step of the compressed signal.

Unlike the first embodiment, the bit stream representing the compressed image will here be changed.

At step S1, the central unit 301 of the device of FIG. 7 which will be described subsequently will recover the indexing parameters which are in our example the number of columns and number of rows of the grid and the number of values of the histograms. These parameters will be detailed subsequently with reference to FIGS. 4a and 4b.

Once this operation has been performed, the central unit passes to step S2, which will recover the coding parameters of the image to be indexed. The parameters obtained will in our example be the number of decomposition levels and the number of quantisation steps. The resolution of the original image is also obtained.

These parameters are extracted from the bit stream which represents the compressed image.

Next, step S3 consists of determining the number of coefficients by rows and columns of the reconstructed image at the lowest resolution level of the compressed image (that is to say the number of coefficients by row and column of the low-frequency sub-band).

Once this step has been performed, the central unit passes to step S4, which will check whether the number of coefficients is greater than or equal to a predetermined threshold.

This threshold is defined by the product of the number of rows (columns) in the grid and the minimum number of coefficients necessary for obtaining a significant histogram. This last value is chosen a priori. In our example this value is 10 coefficients.

If the test is positive, step S4 is followed by step S5, which will be described subsequently.

In the negative, step S4 is followed by step S6, which reconstructs the image in full resolution. The bit stream (or a part thereof) is then used for reconstructing the image.

Once this operation has been performed the central unit passes to step S7, which decrements the decomposition level by one unit.

Once this step has been performed, the central unit, at step S8, tests whether the new value of this decomposition level is lower than the minimum decomposition level, that is to say whether the maximum resolution of the compressed signal has been reached.

In the negative, step S8 is followed by step S9, which then compresses the reconstructed signal according to the decomposition level defined at step S8. This compression can for example be performed using a compression mode without loss.

During this step, the bit stream thus generated is saved as a replacement for the previous stored bit stream.

Step S9 is followed by the previously described step S2. Steps S2, S3, S4, S6, S7, S8 and S9 will be reiterated as long as test S4 is not positive or test step S8 is negative.

Where test S8 is positive, the process stops, since the compressed image cannot then be indexed.

If the test step S4 is positive, that is to say the algorithm has determined from which coefficients the index will be extracted, the central unit passes to step S5, which tests whether the number of quantisation steps is greater than the number of values of the histogram.

If such is the case, step S5 is followed by step S10, which reduces this number of steps by one unit.

The loop S5, S10 will then be reiterated as many times as necessary and in an identical fashion to that described in FIG. 2a.

In the negative, step S5 is followed by step S11, which recovers the quantised coefficients from the bit stream by previously applying an entropic decoding.

Next the central unit will at step S12 test whether the number of steps has been changed.

In the affirmative, step S12 is followed by step S13, which reconstructs the image in full resolution.

Step S13 is followed by step S131, which compresses the reconstructed image according to the new number of quantisation steps. It may be noted that, in this case, information losses will occur.

During this step, the bit stream thus generated is saved as a replacement for the previous stored bit stream. In a variant, this bit stream does not replace the previously stored bit stream.

Step S131 is followed by step S14. If the test of step S12 is negative or follows on from step S131, step S14 recovers the quantised coefficients of the low-frequency sub-band.

Step S14 is followed by step S15, which extracts and stores the index from the coefficients of this sub-band. The process stops following this step.

Figure 3:
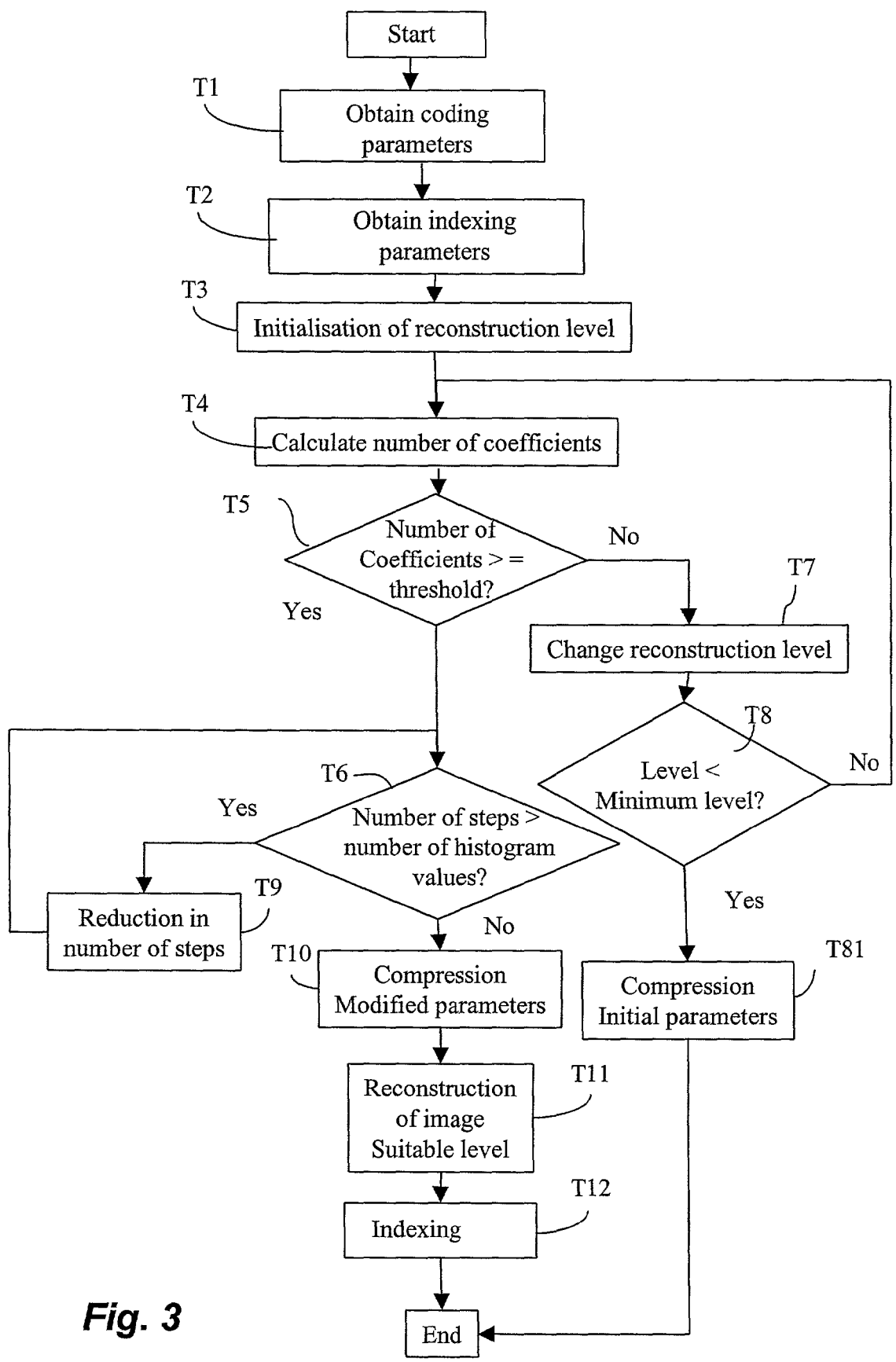
FIG. 3 depicts an algorithm illustrating the compression and indexing of the image according to a third embodiment.

A third embodiment will now be described with reference to FIG. 3.

In this variant the image to be indexed has not yet been compressed, the compression parameters used will be introduced by the user.

In particular, the decomposition level and the number of quantisation steps are used in order to check whether the image can be indexed in a compatible manner with the compression parameters input by the user.

Steps T1 to T9, except for step T2, are identical to steps E1 to E9, and will therefore not be described in this variant.

Figure 7:
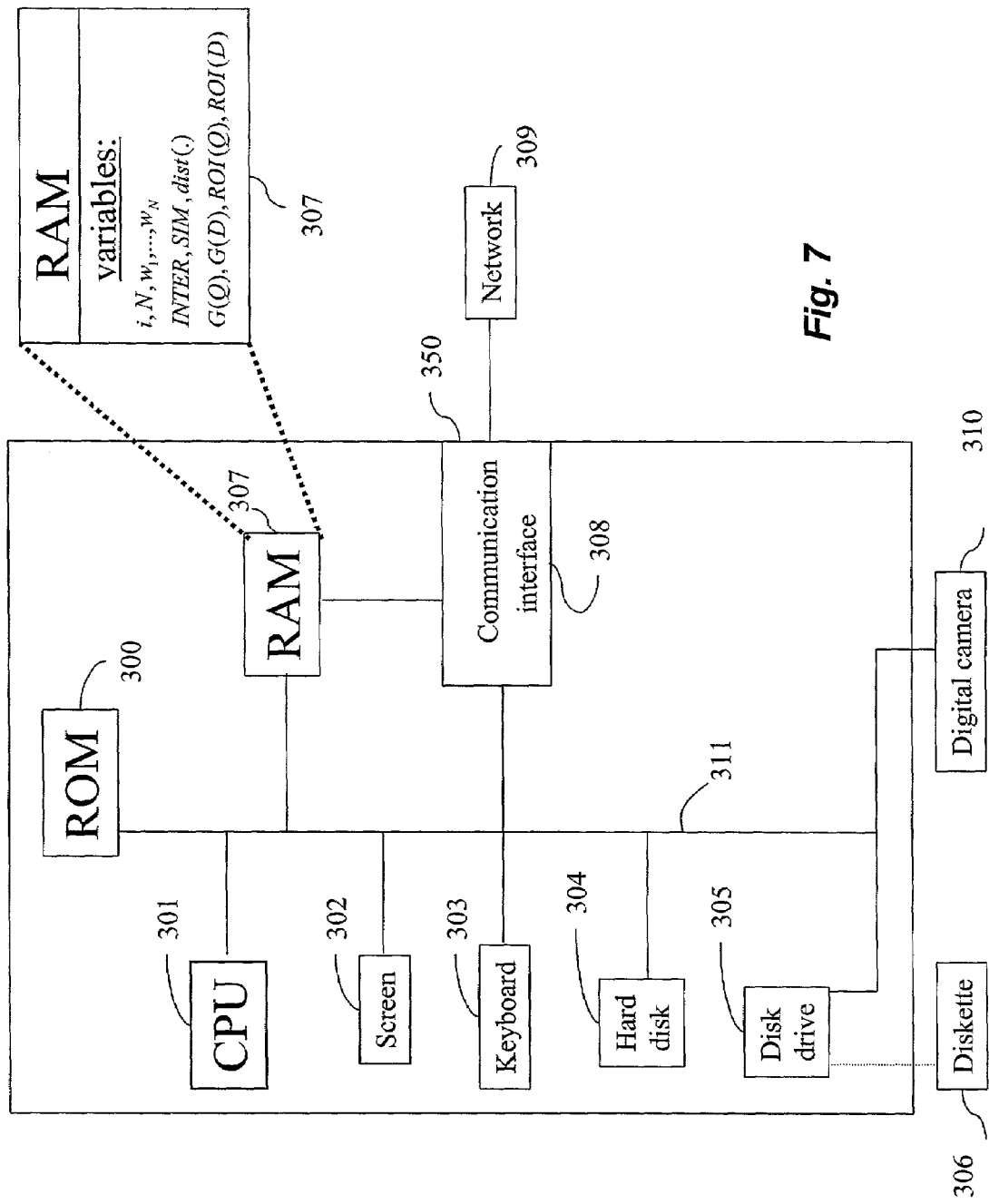
FIG. 7 depicts schematically a computer adapted to implement the indexing method according to the present invention.

Unlike step E2, the obtaining of the coding parameters will consist of interrogating the user by means of the screen 303 of FIG. 7 or 109 of FIG. 1 and obtaining the parameters chosen by the user by means of the input device 112 of FIG. 1 or the keyboard 303 of FIG. 7.

If the test at step T8 is positive, the central unit goes to step T81. During this step, the image will be compressed according to the initial coding parameters. The image will therefore not be indexed.

Where the test of step T6 is negative, the central unit goes to step T10 in order to compress the image according to the current compression parameters, that is to say having or not having been modified in the loops T4, T5, T7 and T8 or T6 and T9.

Step T10 is followed by step T11, which reconstructs the coefficients of the corresponding sub-band at the reconstruction level determined by the algorithm, from quantised coefficients extracted from the bit stream obtained at step T10.

Once this operation has been performed, the central unit passes to step T12, which will consist of indexing the image and storing the index associated with this image. The method stops following this step.

With reference now to FIG. 4a, a description will be given of the method of extracting information representing the visual content of an image, that is to say an index, according to a preferred embodiment of the invention.

The extraction method depicted in FIG. 4a is both used for extracting the index of an image which has to be compressed and stored in memory or for a compressed image already stored.

The operation is performed by the unit 301 of FIG. 7.

The extraction method depicted in FIG. 4a begins with step E410, in which the image Im to be processed is read in memory.

If the image has been compressed, an entropic decoding of the bit stream will be performed and the coefficients of the decompositions into sub-bands, in particular the coefficients of the sub-bands of lowest resolution, will be used.

Still at step E410, a counter i is initialised to the value 1. At the step E412 which follows, the recovered coefficients are divided according to a partitioning of N (N is an integer) blocks $B_1$ to $B_N$.

It should be stated here that the term "partitioning" must be understood here in its mathematical sense, which will be stated below.

A partitioning of a set is a division of this set into non-empty parts, separate to each other, and whose combination is equal to the whole.

However, it is necessary for the number of coefficients, in the case of a compressed signal, in each block ($B_i$), to be sufficient.

In practice, the number of pixels per row (column) in each block must be greater than 10.

This is because, if this condition is not satisfied, the histograms of colours subsequently calculated will only very slightly signify the visual content of a given block.

Figure 4B:
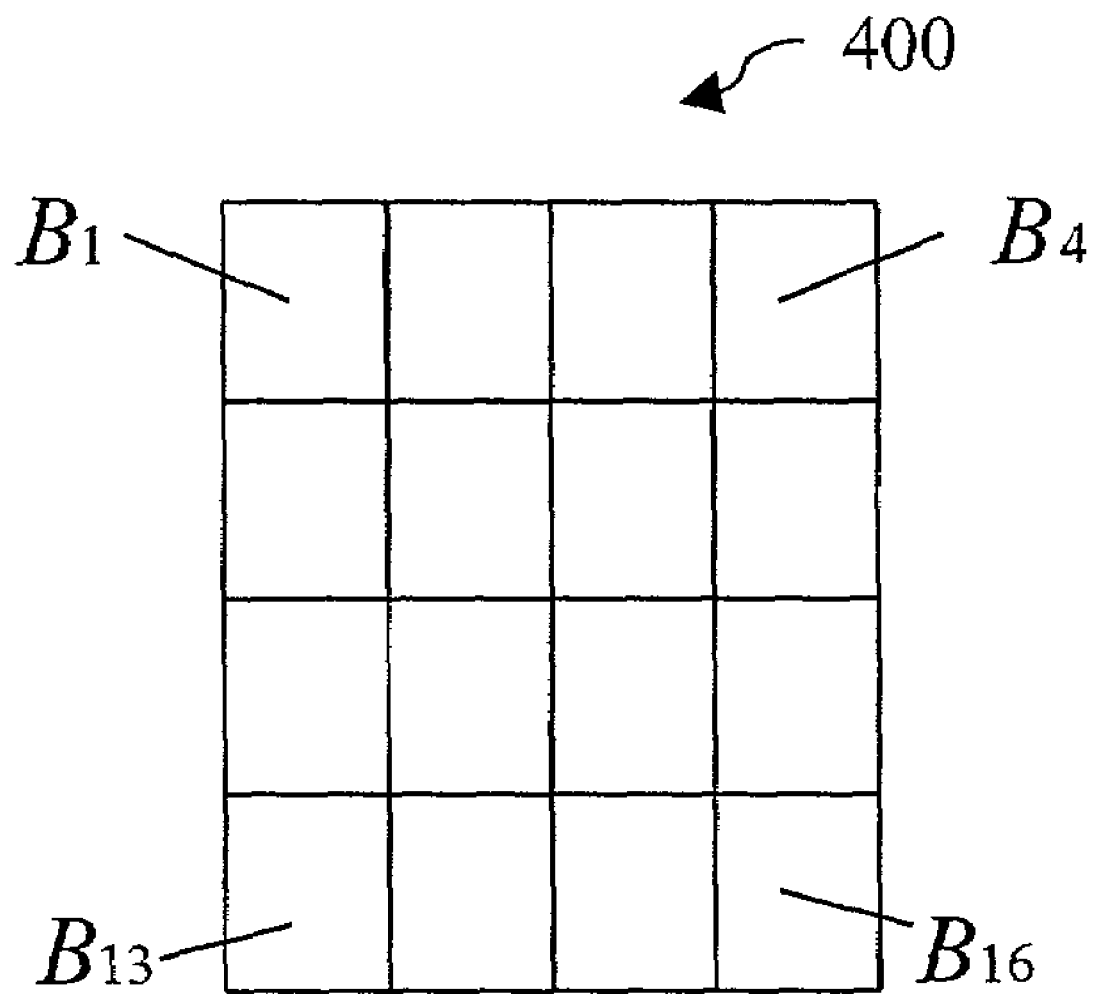

In a preferred embodiment of the invention, the coefficients to be processed are divided according to a rectangular grid into 16 blocks (N=16), as illustrated in FIG. 4b, in which an image to be indexed 400 is divided into 16 blocks with the same surface area $B_1$ to $B_{16}$.

As explained below in relation to FIG. 4a, each of the blocks making up the image is considered one after the other, in order to extract therefrom information representing the visual content of this block.

Returning to FIG. 4a, once the image to be processed has been divided into N blocks (step 412), at the following step E414, a block of the image $B_i$ is selected.

As the counter i has previously been initialised to 1 (step E410), the first step is to select the block $B_1$ (i=1).

At the following step E416, the histogram of colours $H_i$ associated with the block $B_i$ selected is calculated.

The method used in the context of the present invention for calculating a histogram of colours from an image is known from the state of the art.

It is possible, in order to obtain more details on the indexing of an image based on the colour, to refer for example to the article by M. J. Swain and D. H. Ballard, entitled "Color Indexing", International Journal of Computer Vision, 7:1, 1991.

At the following step E418, the histogram of colours calculated at the previous step (E416) for the selected image block is saved in the unit 111 or 307.

At the following step E420, the counter i is incremented. The following step, E422, is a decision step in which it is determined whether the counter i is strictly greater or not than the predefined number N (number of blocks in the image).

In the negative, step E412 is performed once again in order to select the next block in order to calculate the corresponding histogram of colours thereof (steps E416 and E418), the counter i is then once again incremented (E420) and tested (E422).

If the counter i is strictly greater than the number N of blocks, this means that the last block which has been selected is the block $B_N$. Consequently all the blocks have been processed.

In this case the final step E424 is passed to, in which all the histograms of colours calculated corresponding to the different blocks of the image Im are grouped together in a vector of N components:

$$G(Im) = [H_1, \ldots, H_N].$$

Each of the components $H_i$ of the vector G(Im) corresponds to the histogram of colours calculated for the block $B_i$ of coefficients.

It should be noted that, if C designates the total number of colours available (the palette of colours), each histogram $H_i$ includes C elements.

It can also be noted that, although in the preferred embodiment of the invention the space of the colours used is the RGB space, any other space, for example the HSV space (obtained by a linear combination of the RGB space), may also be used.

The vector G(Im) associated with the compressed image constitutes the index representing at least one characteristic of the visual content of the image.

The characteristic of the visual content of the image consisting, in accordance with a preferred embodiment of the invention, of all the distributions of colours (histograms) associated with the blocks of the image.

Figure 5A:
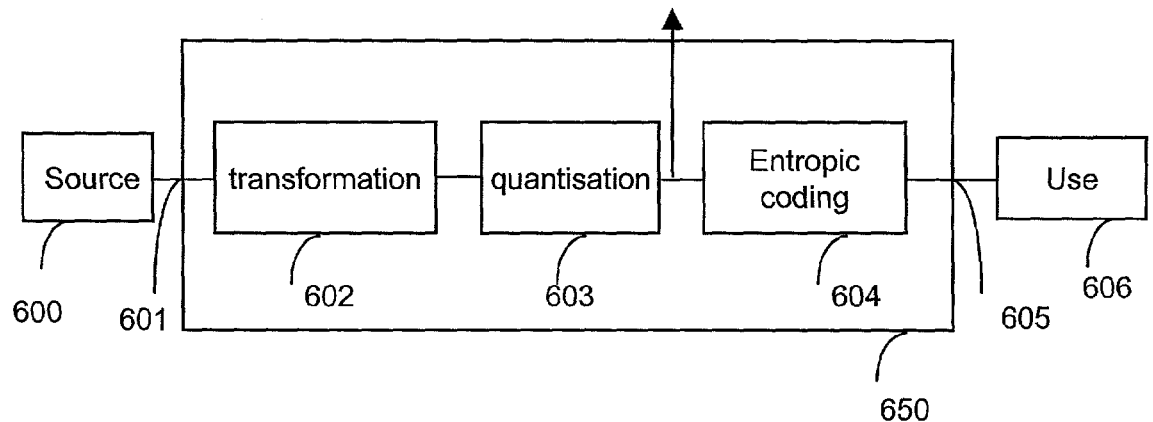
FIG. 5a depicts an image compression device used in the invention.

According to a chosen embodiment depicted in FIG. 5a, a data processing device according to the invention is a data coding device 650.

This device has an input 601 to which a source of non-coded data 600 is connected.

The source 600 has for example a memory means, such as a random access memory, hard disk, diskette or compact disc, for storing non-coded data, this memory means being associated with an appropriate reading means for reading the data therein.

A means for recording the data in the memory means can also be provided.

It will be considered more particularly hereinafter that the data to be coded are a series of digital samples representing an image IM.

The source 600 supplies a digital image signal 601 at the input of the coding circuit 650.

The image signal 601 is a series of digital words, for example bytes. Each byte value represents a pixel of the image IM, here with 256 levels of grey, or black and white image.

The image can be a multispectral image, for example a colour image having components in three frequency bands, of the red-green-blue or luminance and chrominance type. Each band is then processed in a similar manner to the monospectral image.

Means 606 using coded data are connected at the output 605 of the coding device 650.

The user means 606 include for example means of storing coded data, and/or means of transmitting coded data.

The coding device 650 conventionally has, as from the input 601, a transformation circuit 602. The transformations envisaged here are decompositions into signals of frequency sub-bands of the data signal, so as to effect an analysis of the signal.

This decomposition into sub-bands, or more precisely into wavelets, will give coefficients containing frequency and spatial information on the image.

The transformation circuit 602 is connected to a quantisation circuit 603.

The quantisation circuit uses a quantisation known per se, for example a scalar quantisation, or vectorial quantisation, of the samples, or groups of samples, of the signals of frequency sub-bands supplied by the circuit 602.

The circuit 603 is connected to an entropic coding circuit 604, which performs an entropic coding, for example a Huffman coding, or an arithmetic coding, of the data quantised by the circuit 603.

Figure 5B:
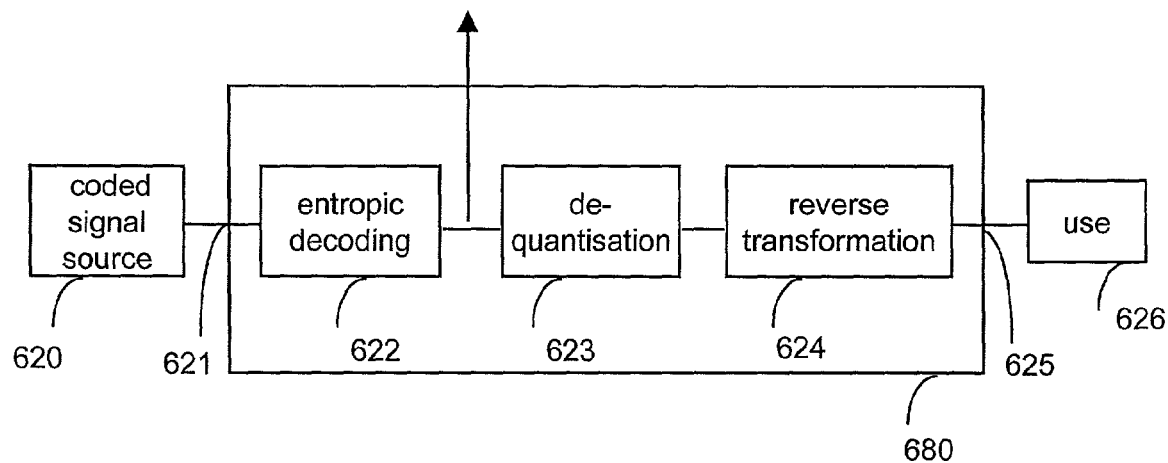
FIG. 5b depicts an image decompression device used in the invention.

FIG. 5b depicts another data processing device according to the invention, in the form of a device 680 for decoding data coded by the device 650.

Means 620 using coded data are connected at the input 621 of the decoding device 680. The means 620 include for example coded data storage means, and/or coded data reception means which are adapted to receive the coded data transmitted by the transmission means 606.

Means 626 using decoded data are connected at the output 625 of the decoding device 680. The user means 626 are for example image display means.

The decoding device 680 performs overall operations which are the reverse of those of the coding device 650. The device 680 includes an entropic decoding circuit 622, which performs an entropic decoding corresponding to the coding of the circuit 604.

It therefore supplies the coefficients necessary for the indexing of the compressed digital image. The circuit 622 is connected to a dequantisation circuit 623, corresponding to the quantisation circuit 603.

The circuit 623 is connected to a reverse transformation circuit 624, corresponding to the transformation circuit 602. The transformations envisaged here effect a synthesis of the digital signal, from frequency sub-band signals.

The coding device and/or the decoding device can be integrated into a digital appliance, such as a computer, a printer, a facsimile machine, a scanner or a digital photographic apparatus, for example.

Figure 6A:
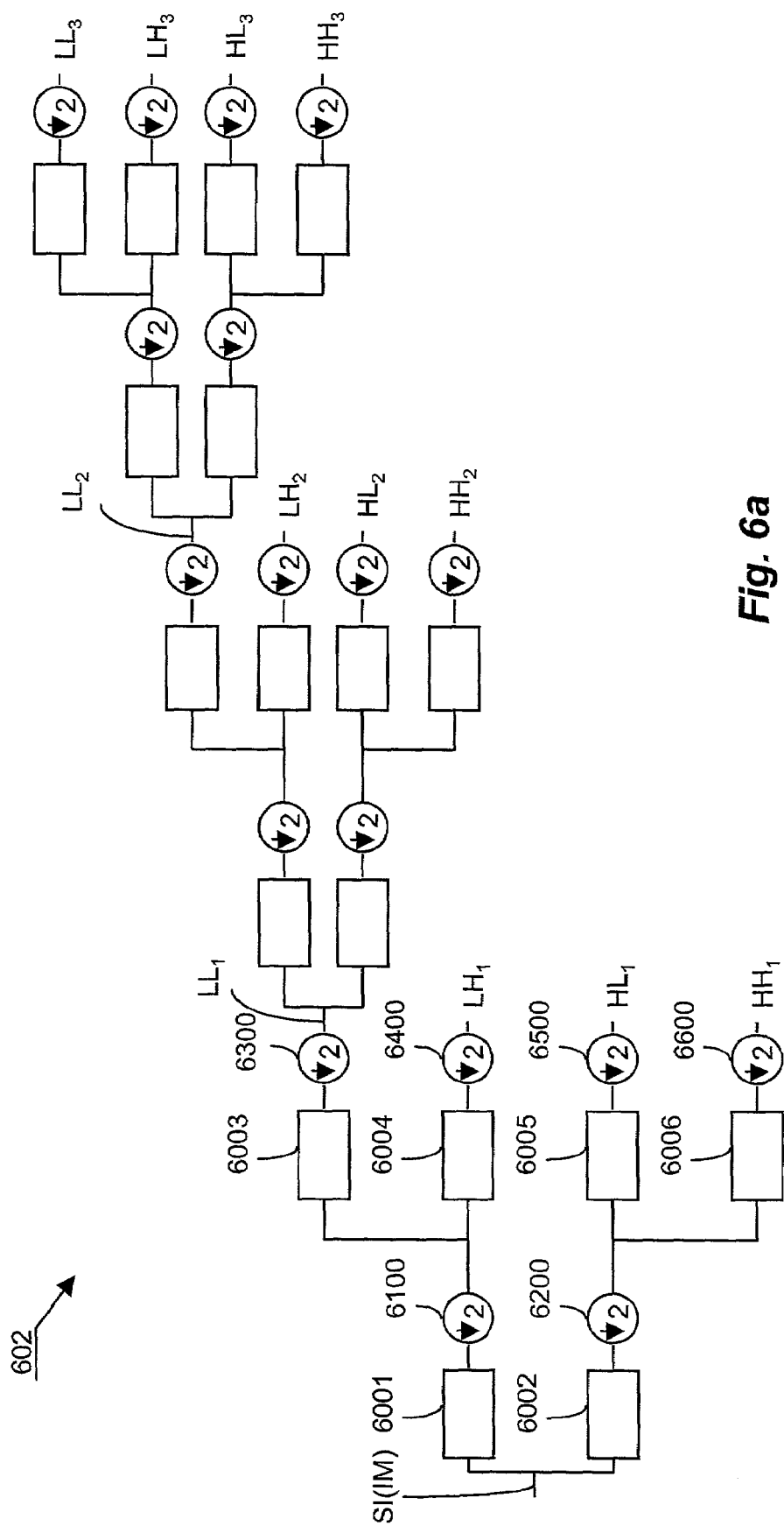

According to FIG. 6a, the circuit 602 includes three successive analysis units for decomposing the image IM into sub-bands according to three resolution levels.

In general terms, the resolution of a signal is the number of samples per unit length used for representing this signal.

The first analysis unit receives the digital image signal and applies it to two digital filters, respectively low pass and high pass 6001 and 6002, which filter the image signal in a first direction, for example horizontal in the case of an image signal. After passing through decimators by two 6100 and 6200, the resulting filtered signals are respectively applied to two low-pass filters 6003 and 6005, and high-pass filters 6004 and 6006, which filter them in a second direction, for example vertical in the case of an image signal.

Each resulting filtered signal passes through a respective decimator by two 6300, 6400, 6500 and 6600. The first unit delivers as an output four sub-bands $LL_1$, $LH_1$, $HL_1$ and $HH_1$ with the highest resolution $RES_1$ in the decomposition.

The sub-band $LL_1$ includes the components, or coefficients, of low frequency, in both directions, of the image signal. The sub-band $LH_1$ includes the components of low frequency in a first direction and high frequency in a second direction, of the image signal. The sub-band $HL_1$ includes the components of high frequency in the first direction and the components of low frequency in the second direction. Finally, the sub-band $HH_1$ includes the components of high frequency in both directions.

Each sub-band is an image constructed from the original image, which contains information corresponding to a respectively vertical, horizontal and diagonal orientation of the image, in a given frequency band.

The sub-band $LL_1$ is analysed by an analysis unit similar to the previous one in order to supply four sub-bands $LL_2$, $LH_2$, $HL_2$ and $HH_2$ with an intermediate resolution $RES_2$ in the decomposition. The sub-band $LL_2$ includes the components of low frequency in both analysis directions, and is in its turn analysed by the third analysis unit similar to the previous two. The third analysis unit supplies sub-bands $LL_3$, $LH_3$, $HL_3$ and $HH_3$, with the lowest resolution level $RES_3$ in the decomposition, resulting from the division of the sub-band $LL_2$ into sub-bands.

Each of the sub-bands of resolution $RES_2$ and $RES_3$ also corresponds to an orientation in the image.

The decomposition effected by the circuit 602 is such that a sub-band of a given resolution is divided into four sub-bands of lower resolution and therefore has four times more coefficients than each of the sub-bands of lower resolution.

Figure 6B:
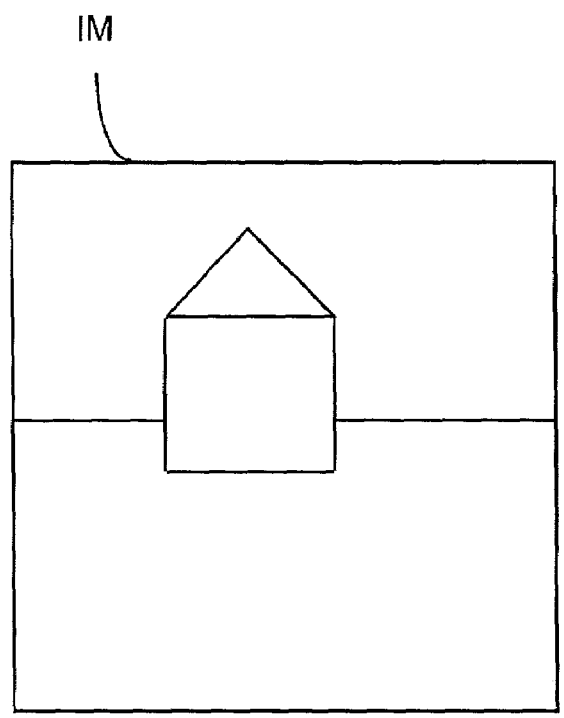
FIG. 6b is a digital image to be coded by the coding device according to the present invention.
Figure 6C:
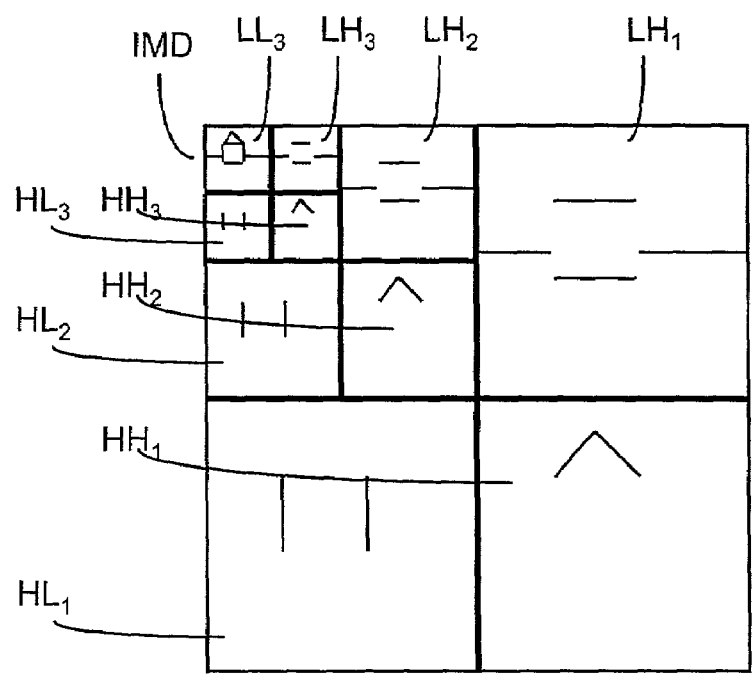

A digital image IM output from the image source 600 is depicted schematically in FIG. 6b, whilst FIG. 6c depicts the image IMD resulting from the decomposition of the image IM, into ten sub-bands according to three resolution levels, by the circuit 602. The image IMD contains as much information as the original image IM, but the information is divided frequency-wise according to three resolution levels.

The level of lowest resolution $RES_3$ contains the sub-bands $LL_3$, $HL_3$, $LH_3$ and $HH_3$, that is to say the sub-bands of low frequency in both analysis directions. The second resolution level $RES_2$ contains the sub-bands $HL_2$, $LH_2$ and $HH_2$ and the highest resolution level $RES_1$ contains the sub-bands of highest frequency $HL_1$, $LH_1$ and $HH_1$.

The lowest-frequency sub-band $LL_3$ is a reduction of the original image. The other sub-bands are detail sub-bands.

Naturally the number of resolution levels, and consequently of sub-bands, can be chosen differently, for example 13 sub-bands and four resolution levels, for a bi-dimensional signal such as an image. The number of sub-bands per resolution level can also be different.

With reference to FIG. 7, a computer adapted to implement the image indexing method according to the present invention will be described.

In this embodiment, the image indexing method according to the invention is implemented in the form of a computer program.

This computer program contains one or more sequences of instructions whose execution implements the steps of the indexing and compression method according to the invention. This computer program is stored on a storage medium which is possibly detachably mountable on a device.

In FIG. 7, the computer 350, which can typically be a microcomputer or a workstation, is connected to different peripherals, for example a digital camera 310 or any other image acquisition or storage device, such as a scanner, supplying information (images, video) to be indexed to the computer 350. These images can be stored in the storage means available to the computer, such as a hard disk 304.

The computer 350 also has a communication interface 308 connected to a communication network 309, for example the Internet, able to transmit to the computer digital information to be indexed.

The computer 350 also has data storage means such as a hard disk 304, a disk drive 305 making it possible to write data on a diskette 306 and to read these data. The computer can also have a drive for compact discs (CD-ROMs) (not shown), on which the images in the database can be stored, as well as a reader for computer cards (PC cards) (not shown).

According to a preferred embodiment of the invention, the executable code of the program for implementing the image indexing method according to the invention is stored in the hard disk 304.

According to a variant embodiment, the executable code of the program according to the invention is stored in a read only memory 300 (ROM) of the computer.

According to a second variant embodiment, the executable code of the program can be downloaded from the communication network 309 via the communication interface 308 in order to be stored on the hard disk 304.

The computer 350 also has a screen 302 for displaying the images to be indexed or which have been indexed and serving as a graphical interface with the user to enable him notably to define an example image, by means of a pointing device (not shown) such as a mouse or a light pen, and a keyboard 303. This same screen makes it possible to dialogue with the user, in particular to interrogate him on the compression parameters or the indexing parameters to be defined.

The computer has a central processing unit (CPU) 301, for example a microprocessor, which controls and directs the execution of the instructions of the program of the invention stored in the read only memory 300 or in the hard disk 304.

The computer also has a random access memory 307 (RAM) containing registers intended to store the variables created and modified during the execution of the program, notably the variables relating to the flow diagrams subsequently described.

The computer has a communication bus 311 affording communication and interoperability between the different aforementioned units making up the computer 350.

Naturally, many modifications can be made to the embodiments of the invention described above without departing from the scope of the invention.

The invention claimed is:

1. A method of indexing a digital image which has been compressed or is to be compressed according to a compression method using compression parameters which influence a resulting quantity of information contained in at least part of the compressed image, the indexing requiring a predetermined quantity of information, the method comprising, prior to a step of indexing the digital image, the steps of:

obtaining at least one compression parameter for at least part of the compressed image;

determining a quantity of information resulting from the use of the at least one compression parameter; and checking whether the resulting quantity of information is appropriate to the predetermined quantity of information required for the indexing of the image, wherein at least one of the parameters obtained in said step of obtaining is obtained by operation of a user, and wherein the indexing is not effected if the resulting quantity of information contained in a predetermined part of the image is not appropriate to the indexing.

2. A method according to claim 1, wherein the quantity of information contained in at least part of the compressed image is represented by a number of coefficients contained in the at least part of the compressed image.

3. A method according to claim 2, wherein said step of checking comprises comparing the number of coefficients contained in the at least part of the image with a predetermined number representing the predetermined quantity of information necessary for indexing the image.

4. A method according to claim 1, wherein the compression parameter is an image decomposition level number.

5. A method according to claim 1, wherein the compression parameter is a quantization step.

6. A method according to claim 1, wherein the at least part of the compressed image is a sub-band of lowest resolution.

7. Digital signal processing apparatus, including means to implement the method according to claim 1.

8. Storage medium storing a program implementing the method according to claim 1.

9. Storage medium according to claim 8, characterised in that said storage medium is a floppy disk or a CD-ROM.

10. Computer program on a storage medium and comprising computer executable instructions for causing a computer to index a digital image according to claim 1.

11. A device for indexing a digital image which has been compressed or is to be compressed according to a compression method using compression parameters which influence a resulting quantity of information contained in at least part of the compressed image, the indexing requiring a quantity of information, the device comprising:

means for obtaining at least one compression parameter for at least part of the compressed image;

means for determining a quantity of information resulting from the use of the at least one compression parameter;

checking means for checking whether the resulting quantity is appropriate to the predetermined quantity necessary for the indexing of the image; and indexing means operating according to a result of the checking means, wherein said indexing means does not operate if the resulting quantity of information contained in a predetermined part of the image is not appropriate to the indexing.

12. A device according to claim 11, in which said determination and checking means are incorporated in:

a microprocessor, a read only memory containing a program for processing the data, and a random access memory containing registers adapted to record variables modified during running of said program.

13. Digital signal processing apparatus, including the device according to claim 11.

* * * * *

UNITED STATES PATENT AND TRADEMARK OFFICE
CERTIFICATE OF CORRECTION

PATENT NO. : 7,251,370 B2 Page 1 of 1
APPLICATION NO. : 10/152023
DATED : July 31, 2007
INVENTOR(S) : Lilian Labelle It is certified that error appears in the above-identified patent and that said Letters Patent is hereby corrected as shown below:

COLUMN 14:

Line 49, "characterised in" should read --comprising--; and
Line 50, "that said storage medium is" should be deleted.

Signed and Sealed this

Seventeenth Day of March, 2009

JOHN DOLL
*Acting Director of the United States Patent and Trademark Office*